United States Patent [19]

Labadie

[11] 3,708,957
[45] Jan. 9, 1973

[54] EXHAUST FILTER UNIT AND METHOD OF FILTERING EXHAUST

[75] Inventor: Paul A. Labadie, Redondo Beach, Calif.

[73] Assignee: Farr Company, El Segundo, Calif.

[22] Filed: Feb. 19, 1971

[21] Appl. No.: 116,913

[52] U.S. Cl. .......................................... 55/36, 55/184
[51] Int. Cl. .............................................. B01d 19/00
[58] Field of Search ........ 55/36, 46, 96, 97, 183–185, 55/282, 301, 304, DIG. 19, 25, 30, 430, 488; 123/119 B; 210/107, 360–369

[56] References Cited

UNITED STATES PATENTS 2,747,687  5/1956  Carter ............................... 55/430 X
3,246,639  4/1966  Oliver ............................. 55/DIG. 19

FOREIGN PATENTS OR APPLICATIONS 233,351  2/1959  Australia ......................... 55/DIG. 25
525,470  5/1956  Canada ................................. 55/488

Primary Examiner—Samih N. Zaharna
Assistant Examiner—R. W. Burks
Attorney—Lyon & Lyon

[57] ABSTRACT

Exhaust from the crankcase of a combustion engine is communicated to a filter to separate undesireable particulate matter, including oil droplets, from the exhaust. During the filtering of the exhaust the filter is adapted to remove the separated matter from the filter media to avoid clogging. The separated oil is returned to the crankcase and the filtered exhaust is re-cycled back into the engine.

31 Claims, 4 Drawing Figures

INVENTOR
PAUL A. LABADIE
BY
Lyon & Lyon
ATTORNEYS

INVENTOR
PAUL A. LABADIE
BY Lyon & Lyon
ATTORNEYS

EXHAUST FILTER UNIT AND METHOD OF FILTERING EXHAUST

This invention relates to a filter and more particularly relates to a self-cleaning, pressure controlled, high-efficiency filter for use in combustion engines.

In a combustion engine it is necessary to vent the crankcase to relieve the build up of pressure caused by the blow by gases. Previously, this was accomplished by merely providing the crankcase with a breather line which exhausted the gases directly into the atmosphere. However, it is felt that these gases contain substances which create air pollution and, therefore, the preferred procedure now is to prevent the escape of these gases into the atmosphere and instead re-cycle the exhaust gases back through the engine.

Re-cycling of these gases requires a filtering of the exhaust before it reenters the engine and pressure control in the communicating exhaust gas lines. These blow by gases contain various elements, including oil particles, which if allowed to enter the engine would tend to clog the valves and other parts of the engine and thereby adversely affect the overall engine performance. Previous filters used to remove these elements and operate at a low efficiency have been less than satisfactory. Higher efficiency filters for this purpose have heretofore been considered impractical, since it was felt that it would be necessary to frequently service and replace the filter media.

As stated before, it is important when re-cycling the exhaust from the crankcase to the engine air intake to control the pressure in the communicating lines. If the pressure is not controlled, the low pressure of the engine air intake will create through the communicating lines a suction force which will suck dirt into the crankcase past the oil seals. It has been found that this pressure can be adequately controlled if the filtered exhaust is communicated to the air intake filter prior to entering the engine. However, the efficiency of the previously used filters is such that there is an insufficient removal of the undesireable elements in the exhaust, including oil particles or droplets which would ruin the air intake paper filter media if the exhaust was passed through the air intake filter. Therefore, when using the prior filters in a re-cycling system it has been necessary to control the pressure by various valve mechanisms. These valve mechanisms are generally complicated and frequently malfunction.

Therefore, it is a primary object of this invention to provide a high efficiency, self-cleaning filter for combustion engines which will permit re-cycling of the crankcase exhaust back into the engine.

It is a further object of this invention to provide a filter which will remove oil particles and the like from the crankcase exhaust to such a degree that the exhaust can subsequently be passed through the air intake filter for pressure control purposes without damaging the air intake paper filter media.

Another object of this invention is to provide a crankcase exhaust filter for combustion engines which is sufficiently compact to be easily mounted within the engine compartment.

A still further object of this invention is to provide a filter which will separate and collect oil droplets in the crankcase exhaust and subsequently return the collected oil to the crankcase.

Accordingly, the present invention is provided with a high density filter media which is rotatably mounted within an enclosed area. Exhaust from the crankcase is communicated into the enclosed area and through the filter media to separate oil droplets and the like from the exhaust. The filter media is operably connected to the engine drive and rotated as the exhaust is passed therethrough to spin off the oil and other collected matter. The filtered exhaust is re-cycled into the engine through the air intake filter and the separated oil is returned to the crankcase.

Other and further advantages and objects of this invention will be made readily apparent from the accompanying drawings and the following detailed description.

Figure 1:
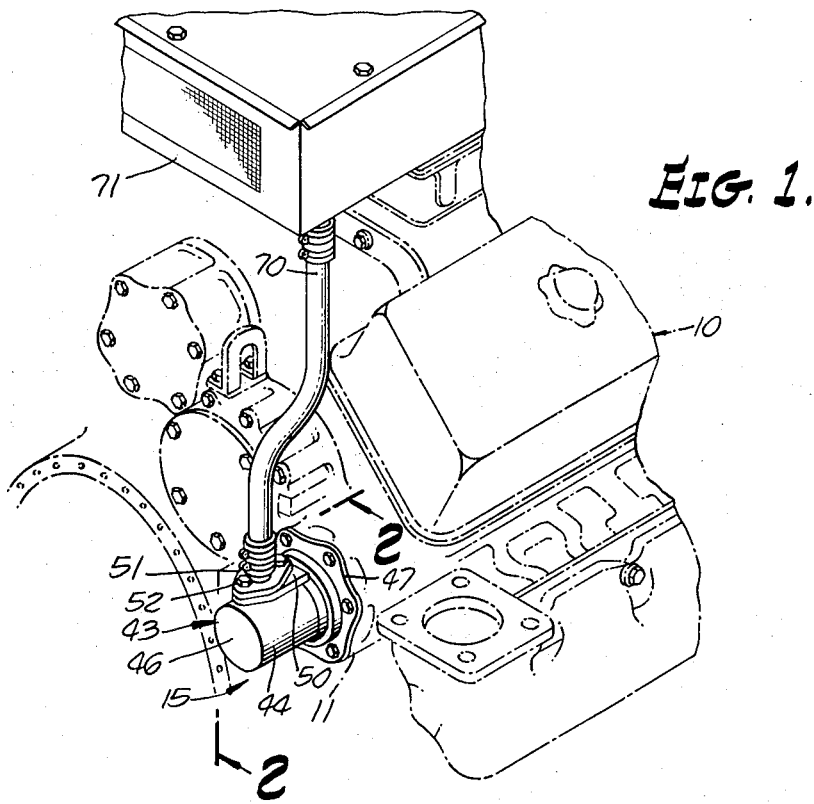
FIG. 1 is a perspective view illustrating a particular commercial embodiment especially adapted for use with a Detroit Diesel engine Model No. 8V71.
Figure 2:
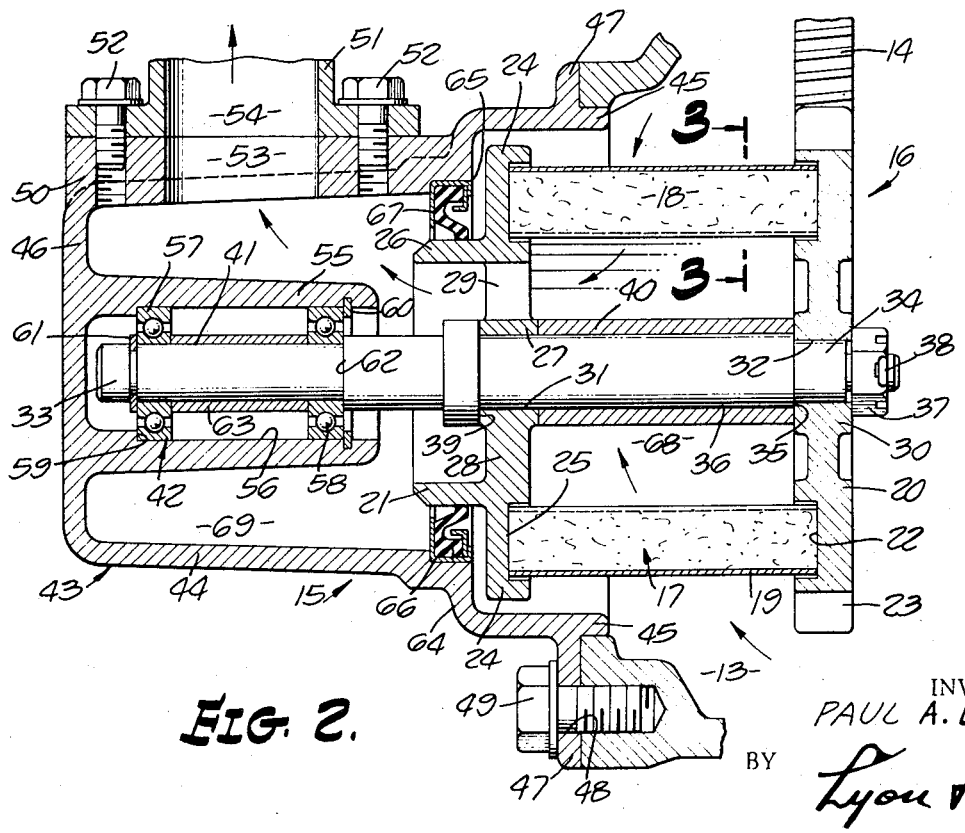
FIG. 2 is a side sectional view taken substantially on the lines 2—2 of FIG. 1.

As indicated above, FIGS. 1 and 2 are directed to an embodiment of the invention which is adapted for use for a particular type diesel engine, a Detroit Diesel Model No. 8V-71. However, it should be noted that the only significant difference between this embodiment and that shown in FIG. 4 relates to the mounting of the filter unit and the connection to the engine drive and it is not intended that the present invention be in any way limited to a particular type engine. The engine shown in FIGS. 1 and 2, as stated before, is a diesel engine, generally designated 10, having an auxilliary power outlet 11 which includes a cylindrical cavity 12 which is in communication with the engine crankcase 13 and an auxilliary drive means 14. Conventially, the cavity is enclosed by a cover plate (not shown), however, this cover plate is removed to accomodate the mounting of the filter unit, generally designated 15.

Figure 3:
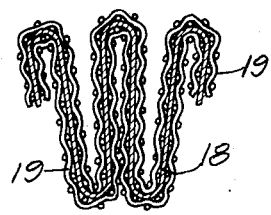
FIG. 3 is a partial cross-sectional end view taken substantially on the lines 3—3 illustrating the filter media.

The filter unit 15 as shown in FIGS. 1 and 2 includes a filter cartridge assembly, generally designated 16, which is rotatably mounted and extends into the cavity 13. The filter cartridge 17 is generally cylindrical and includes a pleated, relatively high density filter media 18. The media 18, seen best in FIG. 3, is preferably comprised of a micro glass fiber with wire screen 19 on each side to form a rigid cartridge 17. The cylindrical shape and pleated arrangement of the media 18 provides a relatively large filter media area per the cross-sectional exhaust flow area. In this particular commercial embodiment the wire on both sides of the media is 14 mesh galvanized wire and the media includes 44 pleats, each of which is approximately five-eighths inches deep.

The cartridge 17 is mounted to a pair of end caps or sealing caps 20 and 21. End cap 20 encloses the innermost extending end of the cartridge 17, with the inside surface of the cap having an annular channel 22 adapted to receive and thereby seal one end of the filter cartridge 17. The outer circumference of the end cap 20 defines a gear 23 which is adapted to mate with the auxilliary drive gear 14 of the engine 10. In this commercial embodiment the end cap 20 is bronze and the gear 23 is helical with 38 teeth. End cap 21 encloses the outermost end of the cartridge 17 and has a radially extending flange 24 which also includes on its inner surface an annular channel 25 similar to channel 22 which is adapted to receive and thereby seal the other end of the filter cartridge. Radially inward and adjacent the flange 24 is a cylindrical sleeve 26 which is concentric with a central collar 27 and connected thereto by three ribs 28 with passages 29 extending therebetween. In the commercial embodiment the end cap 21 is preferably aluminum and both end caps are balanced to permit rotation of the end caps and the filter cartridge at a relatively high rate of speed without undesireable vibrations. End cap 20 also includes a central collar 30, and the collars 27 and 30 include axially aligned central openings 31 and 32, respectively, for mounting the end caps to a shaft 33.

The shaft 33 includes various different diameter portions which assure proper positioning of the various components during assembly and maintain the positioning of the components during operation. Collar 30 includes a keyway (not shown) and is mounted on a decreased diameter end portion 34 adapted to receive the keyway and one side of the collar abuts a shoulder 35 formed by an increased diameter portion 36. A slotted nut 37 is threaded on to the end of the shaft 33 against the other side of the collar 30 and is adapted to receive a cotter key 38 whereby the end cap 20 is secured to the shaft 33. Collar 27 is mounted on portion 36 with one side against a shoulder 39. Positioned against the other inner side of the collar 27 is a spacer sleeve 40 mounted concentrically on the shaft portion 36 and extending between the two collars 27 and 30 to maintain the relative positions of the end caps 20 and 21 on the shaft. In the commercial embodiment the spacer sleeve 40 is preferably steel.

The other end of the shaft 33 includes a reduced diameter portion 41 and is mounted by a bearing assembly, generally designated 42, to a housing or cover, generally designated 43, which is adapted to enclose the filter cartridge 17 within the cavity 13. The housing 43 includes a generally cylindrical sidewall 44, one end 45 of which is adapted to extend into the cavity 13, and an endwall 46 enclosing the other end of the sidewall. Adjacent the end 45 is a radially extending flange 47 having spaced holes 48 therethrough which are adapted to receive mounting bolts 49 which connect the housing 43 to the engine 10. On the outer upper surface of the sidewall 44 is an integrally formed flat mounting surface 50 which is adapted to receive a mounting fixture 51 which is secured to the housing by bolts 52. The top of the housing 43 includes an outlet opening 53 which extends through the sidewall 44 and surface 50 and is in alignment with the opening 54 of the fixture 51.

Extending inwardly from the inner surface of the end wall 46 and concentrically positioned within the sidewall 44 is an integrally formed sleeve 55 having a generally cylindrical bore 56 therein. The bearing assembly 42 is mounted coaxially within the bore 56 and includes a pair of ball bearing sets 57 and 58 which are coaxially fitted around portion 41 of the shaft 33. The outer wall of each bearing is positioned against the inner wall of the bore 56, and the outside of the outer wall of bearing 57 is positioned against a shoulder 59 formed on the bore wall 56, while the outside of the outer wall of the bearing 58 abuts a snap ring 60 secured within an annular groove of the bore wall 56. The outside of the inner wall of bearing 57 is held against a snap ring 61 which is received by an annular groove on the shaft, and the outside of the inner wall of bearing 58 abuts a shoulder 62 on the shaft 33. A bearing spacer 63 mounted coaxially on this shaft 33 between the bearings 57 and 58 abuts the inside of the inner wall of each bearing and prevents relative movement of the bearings.

The sidewall 44 of the cover of housing is enlarged at 64 thereby forming a neck area 65 on the inner surface of the sidewall which is provided with an annular channel 66. The sleeve 26 of the end cap 21 extends coaxially within the neck area 65 and a seal 67 mounted within the annular channel 66 extends between the sleeve 26 and the inner surface of the sidewall 44 to prevent the passage of oil and like materials therebetween and cause exhaust from the crankcase to flow through the filter media 18.

During operation of the filter unit 15, the filter cartridge 17 and filter media 18 are rotated at a relatively high rate of speed by the drive of the engine 10 through the gear 14, and at the same time the exhaust from the crankcase is communicated to the filter and passes through the media 18. Normally, there is a sufficient pressure buildup within the crankcase to cause exhaust flow through the media 18. A slight pressure drop on the upstream side of the filter 15 may be desireable in certain instances, however, too great a drop, as stated before, can be detrimental. The exhaust flows radially through the pleated media 18 into the interior 68 of the cartridge 17 and axially outward through the passages 29 of the end cap 21. As the exhaust flows through the media 18, oil droplets and other like material collect on the outer surface of the media and if allowed to remain would eventually clog the media. However, the rotation of the media 18 and cartridge 17 is sufficient to spin off the collected material, and the oil after being spun off eventually travels back to the crankcase.

The filtered exhaust flows from the passages 29 into the interior 69 of the cover 43 and out through the openings 53 and 54. A conduit 70 connected to the fitting 51 then communicates the exhaust to the air intake filter 71 which is downstream from the engine air intake. The filtered exhaust is then mixed in the filter 71 with the other incoming air and passed through the paper filter media (not shown) of the filter 71 back into the engine 10. By passing the filtered exhaust to the air intake filter 71 rather than directly to the air intake of the engine it is possible to control the pressure on the upstream side of the filter unit without a valve mechanism. However, unless the oil droplets within the exhaust are sufficiently removed, the exhaust would damage the paper filter media of the air intake filter 71 if passed therethrough. The position of the connection between the conduit 70 and the air intake filter 71 may be varied to selectively vary the pressure within the conduit 70, however, care should be taken to connect the conduit 70 in a position where rain or other moisture will not drain into the conduit.

Figure 4:
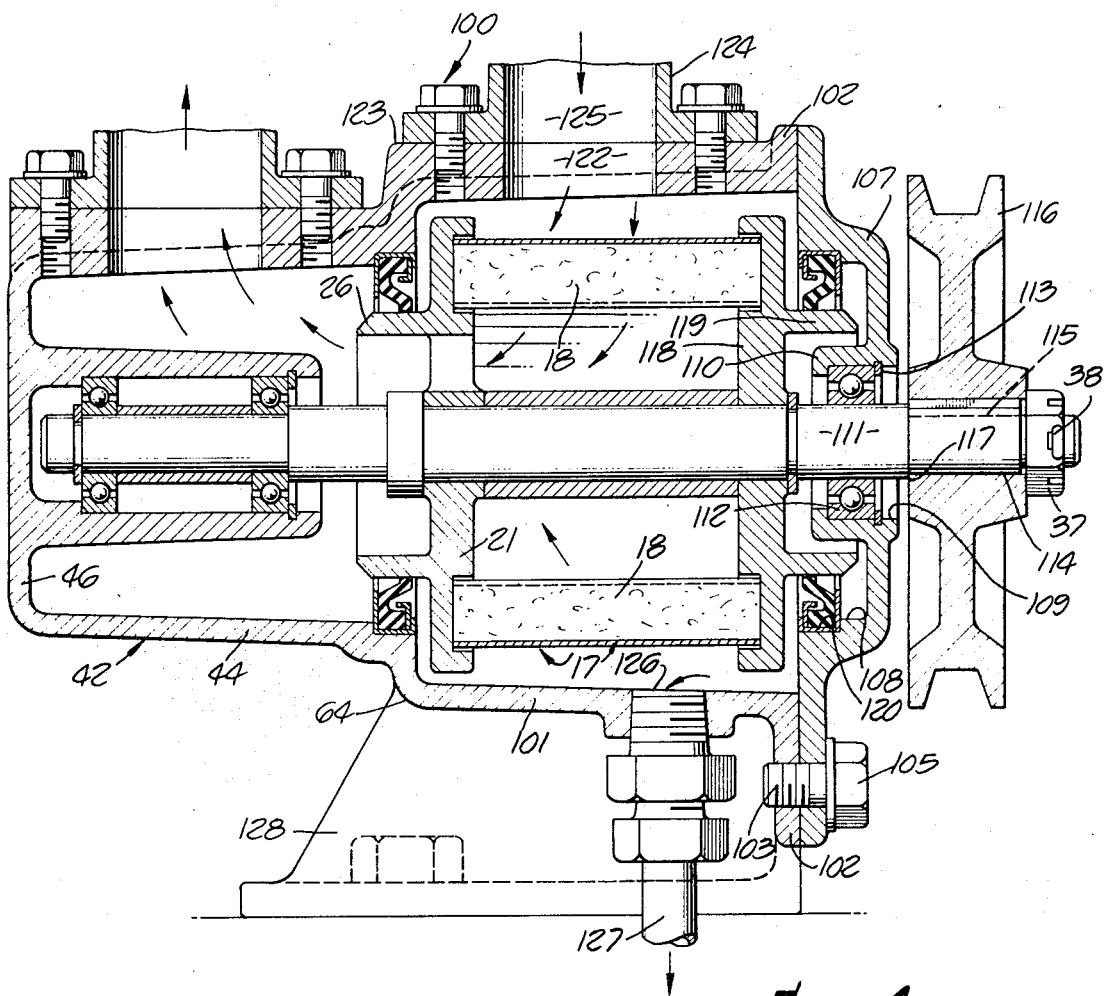
FIG. 4 is a side sectional view illustrating another embodiment which is adapted for use with any type combustion engine.

The embodiment shown in FIG. 4 is essentially identical in operation and includes several identical parts which are designated by the same numerals in the drawings as the embodiment shown in FIGS. 1 and 2. Moreover, the following description will be directed to the structural differences and a repeated description of the identical components is considered unnecessary. Primarily, the embodiment of FIG. 4 is directed to a filter unit, generally designated 100, which can be used in conjunction with any type combustion engine. Thus, in contrast with the other embodiment which was adapted to be mounted in the auxilliary power outlet of a particular engine, the filter unit 100 includes a completely independent housing arrangement.

The housing 42 of the filter unit 100 also includes an end wall 46 and sidewall 44, however, the enlarged portion 64 is extended to form a sidewall portion 101 which coaxially encloses the filter cartridge 17. The end of the sidewall 101 is provided with a radially extending flange 102 having threaded openings 103 therethrough. The flange 102 is adapted to receive a cover plate 104, and bolts 105 extend through openings 106 in the cover plate and into the threaded openings 103 to secure the cover plate to the end of the sidewall. The cover plate 104 also includes an outwardly extending hub portion 107 which forms a neck 108 on the inner surface of the plate 104. The hub 107 includes a central opening 109 with a cylindrical flange 110 extending inwardly from the opening 109. The opening 109 and the flange 110 are coaxial with the bore 56 extending from the endwall 46, and the shaft 33 is provided with an extended portion 111 which extends out through the opening 109 beyond the cover plate 104. The shaft portion 111 is mounted on a ball bearing set 112 with the inner wall of the bearing against the cylindrical flange 110 and the outer wall on the shaft portion 111. The bearing 112 is held in place by a snap ring 113 which is fitted into an annular groove extending around the opening 109 and the end of the flange 110 which is bent radially inward. The end of the shaft portion 111 extending beyond the cover plate 104 is reduced in diameter at 114 and includes a keyway 115. This end of the shaft receives a V - belt sheave 116 which is adapted to slide into the keyway 115 and is secured between a shoulder 117 formed by the reduced diameter portion and the slotted nut 37 and cotter key 38. The V - belt sheave 116 is adapted to be operably connected through a V - belt (not shown) to the engine drive.

The filter cartridge of filter unit 100 is identical to the filter cartridge of filter unit 15 except for a slight change in the design of the end cap adjacent the cover plate 104. This end cap 118 includes a radially extending cylindrical sleeve 119 similar to the sleeve 26 on the end cap 21 which extends into the cylindrical channel formed between the neck 108 and flange 112. The neck 108 is provided with an annular groove 120 which receives a seal 121. The seal 121 extends between the sleeve 119 and the neck of the cover plate and prevents leakage therebetween.

The top of the housing is provided with an inlet opening 122 which extends through the sidewall 101 and is adapted to receive the exhaust from the crankcase of the engine. The outer upper surface of the sidewall 101 is also provided with an integrally formed flat mounting surface 123 which receives a mounting fixture 124 having an opening 125 in matched alignment with the opening 122. The fixture 124 is adapted to connect a conduit line (not shown), which is in communication with the crankcase, to the filter unit 100. The bottom of the housing is provided with a drain opening 126 which extends through the sidewall 101 and provides for communication between the interior of the filter unit 100 and a drain line 126 which extends back to the crankcase. An integrally formed mounting flange 128 extends from the housing to provide a means for mounting the filter unit 100 in a convenient location.

Operation of the filter units 100 and 15 is identical; however, in the unit 100 the filter cartridge 17 and filter media 18 are rotated by the drive of the engine through the V - belt sheave 116 and exhaust enters the enclosed unit through the inlet opening 122. Also, the oil droplets spun off from the media are returned to the crankcase through the drain line 127.

The present invention provides a practical solution to the problem of crankcase exhaust emissions. The filter of the present invention is a high efficiency filter which permits subsequent passage of the filter exhaust through the air intake filter for pressure control purposes without damaging the air intake paper filter media. In addition, the high efficiency of the filter allows for a re-cycling of the exhaust back through the engine without any significant decrease in engine performance. Moreover, the filter is self cleaning to maintain its high efficiency and eliminate the need for frequent service and replacement of the filter media. Also, valve mechanisms normally associated with other exhaust filters are unnecessary when using the present filter and, therefore, a frequent malfunctioning component is eliminated.

Having fully described my invention, it is to be understood that I do not wish to be limited to the details herein set forth, but my invention is of the full scope of the appended claims.

I claim:

1. A self-cleaning filter unit for filtering fluids, comprising;
   a rotatably mounted filter cartridge;
   said filter cartridge including a filter media, said filter media positioned in the flowstream of the fluid and adapted to screen and thereby separate undesirable material from the fluid passing therethrough; and
   means operably connected to said cartridge for rotating said cartridge and thus said media at a sufficiently high enough speed to remove certain of the separated material collected on the surface of said media which would otherwise accumulate and thereby interfere with the filtering of the fluid.

2. The filter unit of claim 1, wherein said filter media is substantially cylindrical in shape with the fluid adapted to flow radially inward through said media and then axially out through an end of said cylindrical media.

3. The filter unit of claim 2, wherein said cylindrical filter media is pleated in cross-section to provide a relatively large filter media area per cross-sectional fluid flow area.

4. The filter unit of claim 3, wherein wire screen on each side of said filter media is provided for structural support.

5. The filter unit of claim 1, wherein said filter media is comprised of a micro glass fiber and defines a hollow cylinder pleated in cross-section, said pleated media provided with a wire screen on each side for structural support.

6. An exhaust filter unit for a combustion engine, comprising:
a filter chamber in the exhaust flowstream having exhaust inlet means and exhaust outlet means;
a rotatably mounted filter cartridge in said filter chamber separating said exhaust inlet and outlet means and having a filter media through which the exhaust passes;
said filter media being adapted to screen the exhaust and thereby separate certain undesirable material from the exhaust passing therethrough which can then be re-cycled back into the engine; and
means operably connected to said cartridge for rotating said cartridge and said media at a sufficiently high enough rate to remove by centrifugal force certain of the separated material collected on the surface of said media which would otherwise accumulate and thereby interfere with the filtering of the exhaust.

7. The exhaust filter unit of claim 6, wherein said rotating means is operably connected to the engine drive.

8. The exhaust filter unit of claim 6, wherein said filter media is cylindrical in shape, end caps at each end sealably enclosing said cylindrical filter media with one of said end caps including passage means whereby exhaust from said exhaust inlet means flows radially inward through said media and axially out through said passage means into said exhaust outlet means.

9. The exhaust filter unit of claim 8, wherein said cylindrical filter media is pleated in cross-section to provide a relatively large filter media area per cross-sectional exhaust flow area.

10. The exhaust filter unit of claim 9, wherein wire screen is provided on each side of said pleated filter media for structural support thereof.

11. The exhaust filter unit of claim 9, wherein said filter media is comprised of micro glass fiber to form a relatively high density filter.

12. The exhaust filter unit of claim 8, wherein said cartridge rotates on a shaft coaxial with said media and secured to said end caps.

13. The exhaust filter unit of claim 12, wherein the circumference of one of said end caps defines a gear, said gear being adapted to mate with a drive gear of the engine and thereby operably connect said cartridge with the engine drive.

14. The exhaust filter unit of claim 12, wherein said shaft is provided with a sheave, said sheave being adapted to receive a V-belt operably connected to the engine drive.

15. The exhaust filter unit of claim 12, wherein a housing enclosure is provided, said housing at least partially defining said filter chamber and including a bearing assembly for rotatably mounting said shaft with said housing.

16. A filter unit for filtering oil and like materials from the crankcase exhaust of a combustion engine, comprising:
a filter housing, said housing at least partially defining a filter chamber;
exhaust inlet means for communicating exhaust from the crankcase to said chamber and exhaust outlet means for communicating exhaust from said chamber;
a filter cartridge separating said exhaust inlet and outlet means, said cartridge having a cylindrical sidewall comprising a filter media through which exhaust passes and end caps enclosing said media, one of said end caps including passage means for communication of exhaust from said cartridge to said exhaust outlet means;
said filter media being adapted to screen the exhaust passing therethrough and thereby separate the oil from the exhaust whereby the exhaust can be communicated to the engine air intake filter and re-cycled back into the engine;
a shaft secured to said end caps and rotatably mounted to said housing; and
means operably connected to said shaft for rotating said media at a sufficiently high enough speed to remove collected oil from the outer surface of said media which would otherwise accumulate and interfere with the filtering of the exhaust.

17. The filter unit of claim 16, wherein seal means are provided between said cartridge and said housing to prevent the bypass around said filter media of exhaust from said exhaust inlet means into said exhaust outlet means.

18. The filter unit of claim 16, wherein said housing is provided with a bearing assembly for the rotational mounting of said shaft.

19. The filter unit of claim 16, wherein said filter media is pleated in cross-section to provide a relatively large filter media area per cross-sectional exhaust flow area.

20. The filter unit of claim 19, wherein a wire screen is positioned on each side of said media to provide structural support.

21. The filter unit of claim 16, wherein said end caps are balanced to avoid vibrations during rotation of said cartridge.

22. The filter unit of claim 16, wherein one of said end caps defines a gear, said gear being adapted to mate with a gear of the engine and thereby operably connect said shaft with the engine drive.

23. The filter unit of claim 22, wherein said gear end of said cartridge is adapted to extend into an auxilliary power outlet cavity of the engine which is in communication with the engine crankcase and an engine gear adapted to mate with said gear of said end cap, said housing adapted to be mounted on said engine and enclose the opening into the auxilliary engine power outlet cavity, said housing and the cavity thereby defining said filter chamber, said exhaust inlet means and said exhaust outlet means.

24. The filter unit of claim 16, wherein means are provided to communicate oil removed from said media to the crankcase of the engine.

25. The filter unit of claim 24, wherein said oil return means comprises a drain line connected to said filter housing.

26. The filter unit of claim 16, wherein conduit means are connected to said exhaust outlet means to communicate exhaust to the engine air intake filter.

27. The filter unit of claim 16, wherein said filter housing encloses said filter cartridge and completely defines said filter chamber, said shaft extends outside said housing and said extended end is provided with a sheave, said sheave adapted to provide a connection between said shaft and the engine drive.

28. A re-cycling process for crankcase exhaust in a combustion engine, the steps comprising:
    passing the exhaust through a filter media adapted to separate oil and the like from the exhaust;
    simultaneously rotating said media to remove oil collected thereon and thereby prevent clogging of said media;
    communicating the exhaust from said media to a pressure control upstream of the engine air intake; and
    passing the exhaust from said pressure control into the engine air intake.

29. The process of claim 28, wherein said pressure control comprises the air intake filter of the engine.

30. The process of claim 28, wherein said media is rotated by the engine drive.

31. The process of claim 28, wherein the oil removed from said media is communicated back into the engine crankcase.

* * * * *